M. J. SEVERSON.
PORTABLE RIG FOR CIRCULAR SAWS.
APPLICATION FILED AUG. 24, 1912.
1,119,886.
Patented Dec. 8, 1914.
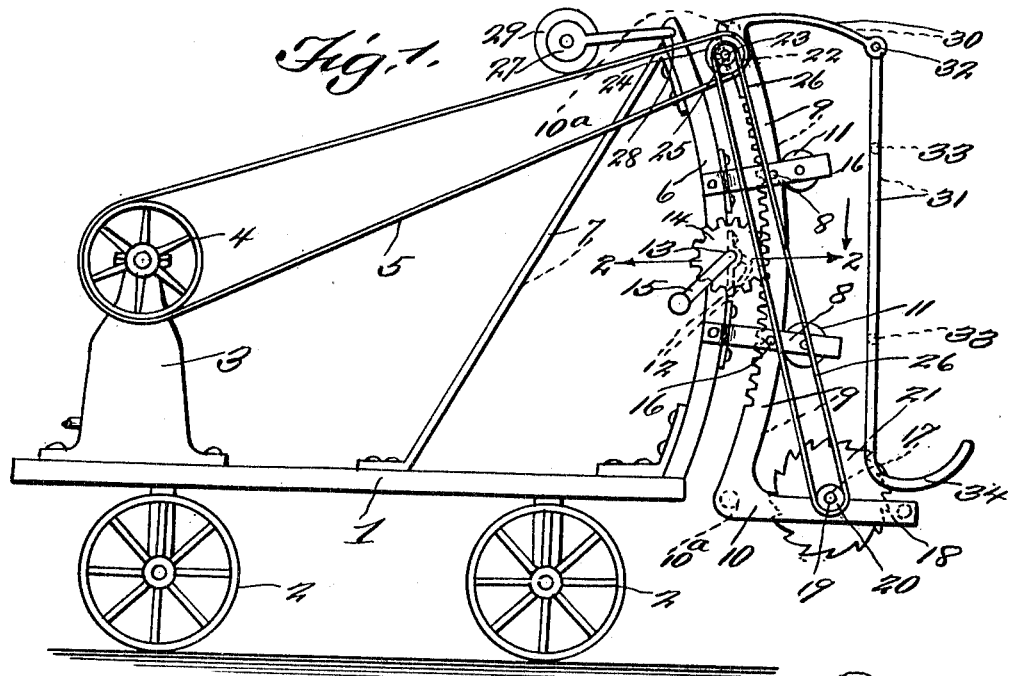
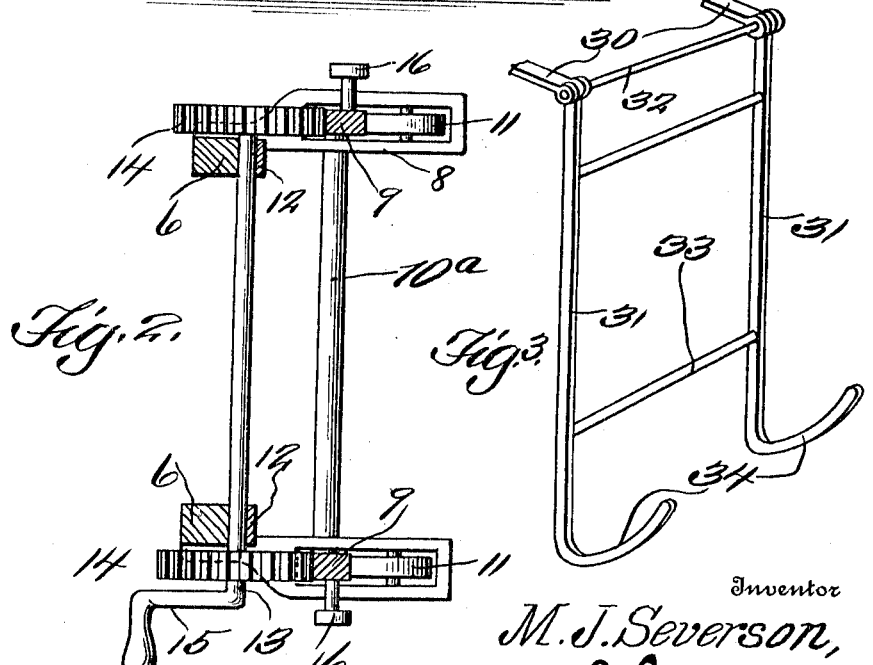
Witnesses
Rohe Meyer
Francis T. Boswell
Inventor
M. J. Severson,
By D. Swift & Co.
his Attorneys

UNITED STATES PATENT OFFICE.

MARTIN J. SEVERSON, OF ROUNDUP, MONTANA.

PORTABLE RIG FOR CIRCULAR SAWS.

1,119,886.  Specification of Letters Patent.  Patented Dec. 8, 1914.

Application filed August 24, 1912. Serial No. 716,852.

*To all whom it may concern:*

Be it known that I, MARTIN J. SEVERSON, a citizen of the United States, residing at Roundup, in the county of Musselshell and State of Montana, have invented a new and useful Portable Rig for Circular Saws; and I do hereby declare the following to be a full, clear, and exact description of the invention, such as will enable others skilled in the art to which it appertains to make and use the same.

This invention relates to a new and useful portable rig for a circular saw, and including means for operating the saw.

As one of the objects of the invention, a conveyance or rig is provided having guides, in which the carriage is vertically guided, said carriage having a rack, with which a manually operated device engages for moving the carriage vertically.

Another object of the invention is the provision of a swing member adapted to hold a log or other commodity while being severed by the circular saw of the carriage.

The invention comprises further features and combination of parts, as hereinafter set forth, shown in the drawings and claimed.

In the drawings: Figure 1 is a view in side elevation of the improved rigging or conveyance including the carriage constructed in accordance with the invention. Fig. 2 is an enlarged detail view of a portion of a rigging and the carriage. Fig. 3 is a detail view.

Referring more especially to the drawings 1 designates the platform of a conveyance, which is mounted upon the supporting wheels 2. Mounted on the platform 1 is an engine 3, the pulley 4 of which has a belt 5 passing thereabout. One end of the platform is provided with an upright frame, comprising standards 6 and the braces 7. Standards 6 are curved on the arc of a circle using the center of the pulley 4 as a center, and are provided with guides 8, in which the rack members 9 of the carriage 10 are guided, there being anti-frictional rollers 11, to insure easy running of the carriage. Mounted in bearings 12 of the standards 6 is a shaft 13 having pinions 14, which engage the teeth of the racks, there being a crank handle 15, by which revoluble movements in one direction or the other, may be imparted to the pinions, which in turn move the carriage vertically. To hold the carriage in adjusted positions thumb screws 16 (which are mounted in extensions of one of the guides 8) are adapted to engage the racks to hold the carriage adjusted. Journaled in bearings 17 of the horizontal portion 18 of the carriage is a shaft 19 having a pulley 20 at one end, and provided with a circular saw 21. Mounted in suitable bearings 22 of the racks is a shaft 23, with which a pulley 24 is movable. An additional pulley 25 is also mounted upon the shaft 23, and about which pulley 25 a belt 26 travels, which in turn travels about the pulley 20, whereby revoluble motion may be imparted to the shaft 19 and the saw 21. The belt 5 travels about the pulley 24, so as to impart motion to the shaft 23, which in turn operates the belt 26. A weighted member 27 pivoted at 28 and provided with a pulley 29, constitutes means for holding the belt 5 tightened. The racks of the carriage are provided with overhanging arms 30, to which the swing bars 31 are pivoted at 32. These swing bars are braced relative to one another by the bar 33, and are provided with lower hooked ends to receive a log or the like, so as to be supported while being severed. By rendering the carriage adjustable, the circular saw may be brought over or above a log or the like lying down, so as to cut the same without supporting it in the swing bars.

The invention having been set forth, what is claimed as new and useful is:—

In combination with a frame having saw operating means thereon, said frame having guides, a carriage mounted in said guides, means carried by said frame and having devices for moving the carriage vertically, a shaft mounted in bearings of the carriage having a circular saw and provided with connections to the saw operating means, said carriage having arms at its upper ends, a work holding carriage pivoted to said arms, and elements in said guides for holding said vertically moving carriage in coöperation with said devices.

In testimony whereof I have signed my name to this specification in the presence of two subscribing witnesses.

MARTIN J. SEVERSON.

Witnesses:
 N. D. DUSENBERY,
 P. RICHARDSON.